United States Patent

[11] 3,617,429

| [72] | Inventor | John R. Le Blanc<br>Wilbraham, Mass. |
|---|---|---|
| [21] | Appl. No. | 861,272 |
| [22] | Filed | Sept. 26, 1969 |
| [45] | Patented | Nov. 2, 1971 |
| [73] | Assignees | Alton Box Board Company<br>Alton, Ill.;<br>Monsanto Company<br>St. Louis, Mo. |

[54] CORRUGATED FIBERBOARD
10 Claims, 2 Drawing Figs.

[52] U.S. Cl. .................................... 161/133,
117/155 L, 161/264, 260/29.3, 260/51.5,
260/844, 260/851, 260/856
[51] Int. Cl. ....................................... B32b 3/28,
B32b 27/42, C08g 37/18
[50] Field of Search.......................... 117/155 L;
161/133, 264; 260/29.3, 51.5, 840, 844, 851, 856

[56] References Cited
UNITED STATES PATENTS

| 2,334,904 | 11/1943 | Cheetham .................. | 260/840 |
|---|---|---|---|
| 3,024,212 | 3/1962 | Paschall et al. ............ | 117/155 L |
| 3,062,699 | 11/1962 | Raphael et al. ............ | 161/264 X |
| 3,135,648 | 6/1964 | Hawkins..................... | 161/249 |
| 3,294,716 | 12/1966 | Pinney....................... | 260/17.2 |
| 3,331,885 | 7/1967 | Rider et al. ................ | 260/826 |
| 3,380,877 | 4/1968 | Smucker et al............. | 260/51.5 X |
| 3,431,162 | 3/1969 | Morris........................ | 161/133 |
| 3,433,701 | 3/1969 | Armour...................... | 161/264 X |
| 3,444,119 | 5/1969 | Le Blanc ................... | 260/29.3 |

Primary Examiner—Robert F. Burnett
Assistant Examiner—Stephen M. Hoffman
Attorneys—John W. Klooster, Arthur E. Hoffman, Richard W. Sternberg and Neal E. Willis ABSTRACT: Corrugated fiberboard which resists deterioration in strength when in the presence of moisture or water, and which has improved folding endurance. Such board is made by preliminarily treating medium and, optionally, liner members with a mixture of aminoplast containing phenol-aldehyde resole resin with polyvinyl alcohol (and/or with polyvinyl acetate and/or partially hydrolyzed such mixtures) and thereafter fabricating corrugated fiberboard from the so-treated members using a waterproof adhesive system containing polyvinyl alcohol, polyvinyl acetate, urea-formaldehyde, and/or phenol-aldehyde.

CORRUGATED FIBERBOARD

BACKGROUND

Corrugated fiberboard has been used for many years and for various purposes, but is well known to have poor wet strength properties. Manufacturers of corrugated fiberboard have tried to improve board wet strength properties and in a few instances some success has been achieved in improving wet strength; however, it is typical to achieve wet strength only with a loss of fiberboard fold endurance (or flexibility). Such loss occurs primarily because, it is theorized, the resin systems used to improve wet strength cause embrittlement in the product board. Efforts, then, to improve corrugated fiberboard wet strength properties take into account the desirability of achieving improvement in wet strength without an undesirably great loss in fold endurance.

There has now been discovered a new type of corrugated fiberboard which not only has surprising and unexpected improvement in wet strength properties, but which has greatly improved fold endurance. Such fiberboard has its medium members, and, optionally, its liner members, treated with a particular mixed resin system, and the medium members are bonded to the liner members with an adhesive system which typically uses one of the polymers employed in the resin treating system. Advantageously, such fiberboard can be produced economically using conventional corrugated fiberboard manufacturing equipment.

Other and further advantages will be apparent to those skilled in the art from the present teachings.

SUMMARY

The present invention relates to a novel corrugated fiberboard construction adapted to have good wet strength and crush resistance and to have improved folding endurance. For present purposes, wet strength and crush resistance of corrugated fiberboard may be conveniently measured comparatively using flat crush resistance data measured on corrugated fiberboard before and after moisture exposure by means of ASTM Test Procedure No. D-1225-54, and on containers made from such corrugated fiberboard using compression test procedures by means of ASTM Test Procedure No. D-642-47. Similarly, for present purposes, folding endurance may be measured using ASTM Test Procedure No. D-643-43.

Sheet members adapted for use in this invention as medium in the manufacture of the corrugated fiberboard utilize cellulosic paper ranging in thickness from about 7 to 15 thousandths of an inch and having basis weights of from about 25 to 36 pounds per 1,000 sq. ft. Such a paper has been treated with from about 5 to 15 weight percent (dry weight basis) of a mixed polymer system as hereinafter described. The paper after such resin system treatment has a total volatiles content of from about 3 to 10 weight percent.

The terms "treated," "treating," or "treatment" as used herein are generic to both impregnation and coating of the substrate paper itself; such can be accomplished in any convenient conventional manner, as hereinafter further detailed and illustrated.

Sheet members adapted for use in this invention as liners in the manufacture of the corrugated fiberboard utilize cellulosic paper ranging in thickness from about 5 to 30 thousandths of an inch and having basis weights of from about 25 to 120 pounds per 1,000 sq. ft. Such a paper has, if treated, from about 2 to 10 weight percent (dry weight basis) of such mixed polymer system, and a total volatiles content of from about 3 to 10 weight percent. Liner sheet members used in the corrugated fiberboard of this invention need not be, but preferably are, so treated with such mixed polymer system.

A corrugated fiberboard construction of this invention employs a treated medium, as above described, and a liner (preferably, though not necessarily, a treated one) as above described. Each such medium is corrugated and positioned adjacent to a liner member on one side thereof (preferably there is a liner in each side of a corrugated medium). Each liner is bonded to its adjoining medium at positions of mutual contact therebetween with a water-resistant adhesive system which contains at least one polymer used in the mixed polymer treating system above indicated. This adhesive system is interposed between such a liner sheet member and such a medium sheet member at such positions of mutual contact therebetween (typically by application to the tips of the corrugated medium flutes before board assembly).

The mixed polymer treating resin system used in this invention comprises (on a 100 dry weight percent total basis):

A. from about 25 to 95 weight percent of at least one aminoplast containing phenol-aldehyde resin system selected from the group consisting of:
1. condensation reaction products of phenol, formaldehyde, and at least one aminoplast selected from the group consisting of urea, melamine, and dicyandiamide, and
2. compositions comprising a phenol-formaldehyde resole resin and at least one such aminoplast, and each such aminoplast containing resin being further characterized by having:
3. a mol ratio of combined formaldehyde to phenol ranging from about 1.0 to 3.0,
4. a total nitrogen content ranging from about 3 to 20 weight percent (based on total dry resin weight), and
5. a water solubility such that at least about 30 weight percent aqueous solution of resin solids can be prepared, and B. from about 5 to 75 weight percent of at least one polyvinyl polymer selected from the group consisting of polyvinyl acetate, partially hydrolyzed derivatives of polyvinyl acetate, and substantially fully hydrolyzed polyvinyl alcohol, and each such polyvinyl polymer being further characterized by having a molecular weight such that an aqueous solution or colloidal dispersion (including latices, emulsions, etc.) thereof can be prepared initially which, at a polymer concentration of about 4 weight percent, has a viscosity of from about 5 to 125 centipoises (cps).

In addition, such mixed polymer treating solution preferably contains (same basis) from about 0.2 to 5 weight percent of an ammonium salt of a mineral acid.

Although phenol itself is generally employed in the formation of phenol-aldehyde resins as above described, other phenols known to the art are also suitable for use in this invention, such as lower alkyl substituted phenols (such as cresol, xylenol, etc.), resorcinol, and the like. Such other phenols as used are usually employed in combination with phenol itself.

THE AMINOPLAST-CONTAINING RESINS

Aminoplast-containing phenol-aldehyde resins as described above are well known to the prior art. Condensation reaction products of phenol-formaldehyde and at least one aminoplast may be made, for example, by techniques taught by Mestdagh et al. in U.S. Pat. No. 3,004,941. Aminoplast modified resins of phenol and formaldehyde are preferred.

Thus, such a modified phenol-formaldehyde resin useable in this invention can be prepared by first condensing from about 1.5 to 5 mols of formaldehyde per mol of phenol. Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9–15 weight percent based on total weight of starting reactants. The formaldehyde used in the starting reactants can be in the ratio range of about 1.5 to 5 mols per mol of phenol, and preferably, ranges from about 1.5 to 3.5 mols of formaldehyde per mol of phenol. Such aqueous condensation product of phenol and formaldehyde, having the excess formaldehyde, is cooled to about 30° to 50° C. The aminoplast (dicyandiamide, melamine, or urea, or mixture thereof) is then added in such a proportion that the ratio is generally, and preferably, about 1 mol of the aminoplast to about 0.5 to 2.0 mols of formaldehyde in the resulting formaldehyde condensation product with dicyandiamide, melamine, and/or urea, and more preferably, about 1.2 to 1.6 mols of formaldehyde. For example, when employing a mixture of dicyandiamide, melamine, and urea, the mixture can consist of from about 10 to 90 weight percent of dicyandiamide, and, correspondingly, about 90 to 10 weight percent of urea.

Alternatively, the process for preparing an aminoplast modified phenol-formaldehyde resin for use in this invention can be accomplished by reacting dicyandiamide, melamine, or urea, or mixture thereof, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of aminoplast to formaldehyde remains as above indicated.

Other methods known to the art can be used for preparing such a modified resin for use in this invention. Typically, such methods involve the separate preparation of a phenol-aldehyde condensate resin composition which is initially not only water soluble but also water dilutable to the extent desired. The dicyandiamide, melamine and/or urea formaldehyde condensation product, as those skilled in the art readily appreciate, can be prepared separately by conventional techniques in the form of a resin which is typically not only water soluble, but also water dilutable to the extent desired. Such a separately prepared formaldehyde condensation product with dicyandiamide, melamine or urea can have a mol ratio of dicyandiamide melamine and/or urea to aldehyde of from about 0.5 to 5. The resin is then added to the preformed phenol-aldehyde resin. Preferably, aminoplast modified phenol-aldehyde resins for use in this invention have a total combined nitrogen content ranging from about 3 to 12 weight percent (dry weight basis), and, in general, this nitrogen content is less than about 20 weight percent.

A suitable phenol-aldehyde resole resin system can be made by any conventional procedure known to the art of phenolic resins. For example, one convenient and preferred procedure involves condensing usually at temperatures ranging from about 50° to 80° C. phenol and formaldehyde in the above-indicated desired mol ratio under aqueous liquid phase conditions in the presence of a basic catalyst, such as an alkali metal hydroxide such as sodium hydroxide or an alkaline earth hydroxide such as calcium hydroxide, a trialkyl amine such as triethylamine, and the like until a desired end point is reached, such as, for example, a free-formaldehyde content which is less than about 3 to 10 weight percent.

The product is a phenol-formaldehyde resole resin in aqueous solution having a total solids content of from about 30 to 70 weight percent. Usually and preferably, the resin solution is prepared as a concentrate of from about 40 to 55 weight percent solids (based on the total solution weight) which may be conveniently and preferably diluted down before use to a solids content of from about 5 to 50 weight percent. Preferably, the solids content of the concentrate ranges from about 45 to 60 weight percent and preferably the solids content of diluted working solution ranges from about 15 to 45 weight percent.

For use in the product of this invention, it has been found that this resole resin should preferably not be advanced in manufacture beyond the point where it has a water solubility such that about a 55 weight percent solids in aqueous solution thereof can be prepared (more preferably about 30 weight percent). Also, it has been found that this resole resin should preferably have a methylol content per aromatic ring of from about 0.5 to 3 (more preferably from about 1 to 2.5) as determined, for example, by NMR measurements. If such resin is more advanced (i.e., has a high molecular weight) than such a solubility as above indicated, or if such resin has a different methylol content than that above indicated, then it appears to have undesirable paper-treating characteristics, especially at the high application speeds conventionally employed for paper transport in the manufacture of corrugated fiberboard, for purposes of making the improved products of this invention. It will be appreciated by those skilled in the art that, in general, treatment of paper with resin will usually, as a matter of convenience, be accomplished as a separate, preliminary operation before boxboard manufacture is undertaken.

In addition, it has been found that this resole resin should preferably have a pH of from about 5.6 to 9.2 when in the form of an aqueous solution of about 35 weight percent total resin solids (preferably from about 7 to 8.5). Also, it has been found that this resole resin should preferably have an ash content of less than about 2.5 weight percent based on about a 35 weight percent aqueous solution of total resin solids (preferably less than about 0.7).

One convenient way in which to measure the ash content for present purposes is to take 2 grams of such an aqueous solution (35 percent solids) and deposit same in a crucible. The crucible is then heated to about 150° C. for about 2 hours to substantially completely cross-link the resin and evaporate free water and thereafter the crucible is exposed to about 540° C. for about 24 hours. Afterwards, the crucible is cooled to room temperature and measured to determine an increase in weight over starting empty weight thereby giving the ash content of the resin.

If such resin has a lower or higher pH, or a higher ash content, than those respectively above indicated, then it appears to have undesirable effects upon product paper treated therewith, especially in the properties of corrugated fiberboard made therefrom, for purposes of making the improved products of this invention.

In making the modified phenol-aldehyde resin systems for use in this invention, it is generally convenient and preferred to add the ammonium salt and the aminoplast (which when uncombined is preferably urea) in the respective amounts above indicated, each in the form of a finely divided powder, or even (preferably) already dissolved in water, to the diluted or partially diluted phenol-formaldehyde resole resin (just described). Such addition causes this pH of a product resin system to fall in the range from 0.8 to 6, as above described.

Sometimes in order to make the pH of the product phenol-aldehyde resin system low, yet within the indicated range, one may, if desired, add to a given resole resin solution, preferably diluted for use and with the ammonium salt and urea already dissolved therewith, amounts of a strong inorganic acid, such as hydrochloric, or the like, until the pH is lowered to some desired value; however, such an acid addition is generally not necessary owing to the presence of the ammonium salt which itself tends to produce a pH within the ranges indicated.

It is to be noted, that in a resin composition for use in this invention, the chemical composition of such an aminoplast phenol-aldehyde resin can itself vary. For example, although during the reaction of the condensates, the phenol, the dicyandiamide, the melamine, and/or the urea will preferentially react with the aldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol-dicyandiamide-urea-formaldehyde reaction products. It is understood that these reaction products would only exist in minor amounts with the predominant portion of the condensation reaction products being phenol-formaldehyde and dicyandiamide-formaldehyde, or mixtures of dicyandiamide-formaldehyde and urea-formaldehyde. In general, the preparation of aminoplast modified phenol-aldehyde is known to those skilled in the art and does not form a part of the present invention. As those skilled in the art will appreciate, the aminoplast modified phenol-aldehyde resins used in the present invention are of the resole type since not only is the phenol-aldehyde condensation conducted under basic catalysis conditions, but also the aminoplast modification thereof is conducted under basic catalysis conditions.

As indicated above, the aminoplast modified phenol-aldehyde resole resin system and the ammonium salt are substantially completely dissolved in water at the time of paper treatment to make products of this invention. Minor amounts, say up to 5 or 7 weight percent of each such material may not be truly dissolved (especially in concentrates) but such deviations are within the contemplation of this invention in the word "substantially."

The aminoplast modified resin used is conveniently and preferably prepared as a concentrate of from about 40 to 55 weight percent resin solids (based on total resin solutions weight). This concentrate is conveniently and preferably diluted down before use to a resin solids content of from about 5 to 50 weight percent. After the ammonium salt is added to and dissolved in the working solution, the solids content of a concentrate can range from about 45 to 60 weight percent typically and preferably the solids content of a diluted working solution ranges from about 15 to 45 weight percent.

For use in the present invention, it has been found that an aminoplast modified resin as described above should not be advanced in manufacture beyond a point where it has a water solubility such that about a 55 weight percent solids content aqueous solution thereof can be prepared (preferably about 30 percent). Preferably, this aminoplast modified resin has a methylol content per aromatic ring of from about 0.5 to 3 (more preferably from about 1 to 2.5) as determined, for example, by NMR measurements. If such resin is more advanced (i.e., has a high molecular weight) than such a solubility as above indicated, or if such resin has a different methylol content than that above indicated, then it appears to have undesirable paper-treating characteristics, especially at the high application speeds conventionally employed for paper transport in the manufacture of corrugated fiberboard, for purposes of making the improved products of this invention.

As indicated above, any ammonium salt of a mineral acid can be used in the present invention. Examples include ammonium halides (ammonium chloride preferred), ammonium nitrate, ammonium sulfate, ammonium phosphate and the like.

It is generally convenient and preferred to add the ammonium salt in the respective amounts above indicated to the solution of aminoplast modified resin in the form of a finely divided powder or, more preferably, already dissolved in water. It is preferred that at the time of use, the ammonium salt be substantially completely dissolved in the working solution. Preferably, the ammonium salt is not added to the resin solution until shortly before a medium or liner sheet member is to be treated therewith.

THE POLYVINYL POLYMER

Polyvinyl polymers as described above (including homopolymers and copolymers) are well known to the prior art and are well described in the literature, so no detailed description thereof is deemed necessary or desirable herein.

Preferred polyvinyl alcohols for use herein contain not more than about 10 weight percent (based on total polymer dry weight) of residual ester groups, and a preferred polyvinyl acetate for use herein contains not more than about 75 weight percent (based on total polymer dry weight) of its acetate groups hydrolyzed. It will be appreciated that any partially hydrolyzed polyvinyl acetate (or incompletely hydrolyzed polyvinyl alcohol) as indicated above can be used in this invention.

THE PAPER

As those skilled in the art will appreciate, in the art of corrugated fiberboard, it has been conventional to employ as the medium sheet member a semichemical cellulosic paper. A corrugated medium member is formed by running a continuous sheet of medium through corrugating rolls. The medium, or "9 point" as it is sometimes called, takes on a wavelike shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1,000 sq. ft. having a thickness of about 0.009 inch for all grades of combined board, but for purposes of the present invention, may be heavier or lighter for special requirements. Corrugating medium, for example, is most commonly made from "semichemical" pulp, but is also made from straw, Kraft, bogus, or chip (mixed, repulped fibers).

There are four conventional or standard sizes of corrugations as follows:

TABLE I

| Trade Designation | Number of Flutes per foot (approximate) | Thickness of Single Wall Board¹, in. |
|---|---|---|
| A | 33–39 | 0.185–0.210 |
| B | 47–53 | 0.097–0.105 |
| C | 39–45 | 0.139–0.145 |
| E | 90–97 | 0.045–0.0624 |

¹ Approximate, depending on thickness of facings and also the particular corrugating rolls.

As with medium sheet members, any conventional cellulosic liner sheet member can be used in the manufacture of the corrugated fiberboard of the present invention. Generally, the liner sheet members are made from sulfate Kraft, but sometimes are made from other pulps.

Kraft for liner sheet members is usually made on a Fourdrinier machine although some is made on a cylinder machine. Commonly, liner sheet members are made to standard weights, such as 26, 33, 38, 42, 47, 69, and 90 pounds per 1,000 sq. ft. with thicknesses for such liner sheet members ranging from about 0.008 to 0.025 inch. Special linerboard can be used.

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single-face board; when facings are on both sides of the corrugated medium sheet member, the product is sometimes called single-wall board or double-face board. If there are two sheets of flutes with a facing on each side and one in the middle, the product is sometimes called double-wall board. If there are three layers of flutes with two outer liner facings and two inner liner facings between medium layers, the product is sometimes called triple-wall board.

PAPER TREATMENT

The medium and liner can be treated with a mixed resin system by immersion or any other convenient coating techniques. In a product corrugated fiberboard, only the medium need be resin treated, but preferably, both liner and medium sheet members are resin treated. For example, in liner treatment, a preferred method involves surface coating rather than immersion impregnation. Suitable coating procedures involve application to one surface of a liner with a roller coater, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat medium sheet members with a resin system.

After treatment, a medium or liner sheet member is dried. Drying may, for example, be accomplished by passing such over or through a hot zone such that the temperature of the liner and/or the medium preferably does not exceed about 107° C. for more than about 0.1 second so as to avoid thermosetting the resin system. In drying, water is substantially completely removed without appreciable advancement or curing of the resin impregnated into the liner or medium sheet member. Thus, the percentage of volatiles in a treated liner or medium is controlled within the range of about 3 to 10 weight percent (total weight basis). For example, if the percentage of volatiles is reduced below such range, the resin system tends to cross-link and subsequently during corrugated fiberboard production reduced adhesive bonding to such a resin cross-linked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate.

ADHESIVE SYSTEMS

The adhesive systems used in this invention are well known to the prior art and employ at least one polymer selected from the group consisting of aminoplast containing phenol-aldehyde resin systems as described above, polyvinyl polymers as described above, urea-formaldehyde resins, phenol-formaldehyde resins and mixtures thereof. Such adhesive systems are well known to those of ordinary skill in the art.

In general, a given adhesive system employed in the products of this invention should have a water resistance after setting or curing sufficient to provide a post-water soak paper-to-paper fiber-tearing bond. Such a water-resistant bond is conveniently measured after a 12-hour (24 hours preferred) room temperature water soak between two 42-pound basis weight sheets, each about 12 thousandths of an inch thick, both sheets being bonded together using an adhesive application rate equivalent to about 4 pounds adhesive solids per 1,000 sq. ft. of paper surface, and permitting such adhesive application to such a pair of sheets bonded together therewith to dry in air for about 24 hours before such test commences. The sheets are bonded together after a wet adhesive application before any appreciable moisture loss of that adhesive system's water has occurred and before using the conventional or usual setting or curing conditions employed in the art for that adhesive system.

Typically, such an adhesive system may contain, for example, from about 2.5 to 35 weight percent (dry weight basis) of such a polymer as above described, the exact amount in any given system, of course, being dependent upon individual circumstances and preferences, as those skilled in the art will appreciate, with the balance up to 100 weight percent being selected from a group consisting of supplemental binders, fillers, and adjuvants.

In the case of the formaldehyde containing polymers, the art conventionally extends such with starch to make the desired water-resistant adhesives. One preferred type of adhesive for use in this invention is one selected from the group consisting of phenol-starch-formaldehyde adhesives (including, especially, resorcinol-starch-formaldehyde adhesives), urea-starch-formaldehyde adhesives, and aminoplast-modified phenol-formaldehyde starch adhesives. Preferably, the starch is partially reacted with the resin. Resole type phenolic resins are also preferred. In general, such adhesive systems are well known to the art and when set are substantially fully water resistant. Such adhesive systems for use in the present invention preferably have cure or set times not less than about 15 seconds at 170° C. An advantage of such adhesive systems from the standpoint of utilization in the present invention is that they characteristically display quick tack properties which make them suitable for corrugated fiberboard manufacture on high-speed equipment. Such adhesive systems are also compatible with the aminoplast-containing resin systems above described, and coact therewith in accordance with this invention to produce the corrugated fiberboard products of this invention.

One more preferred class of adhesive systems for use in this invention is that of resorcinol-formaldehyde-starch adhesive systems. Typically, such an adhesive system contains at least about 1 weight percent (based on total adhesive system solids) of combined formaldehyde, typically the average number of combined mols of formaldehyde per mol of material selected from the group consisting of phenol, resorcinol (preferred), urea, melamine, and dicyandiamide, ranges from about 1.0 to 2.9 and typically such a system contains about 70 weight percent of starch (based on total adhesive solids). Variations, of course, are possible without departing from the spirit and scope of this invention. Methods for their preparation are given in such references as U.S. Pat. Nos. 2,884,389; 3,294,716; and 2,886,541; and the like. Commonly, a supplier provides such an adhesive as a one or a two-tank formulation, which, in the latter case, are combined before use and typically are further diluted with water before actual use.

Another preferred class of adhesives for use in the present invention are those using substantially fully hydrolyzed polyvinyl alcohol. The polyvinyl alcohol thus used characteristically and preferably has a molecular weight such that a 4 weight percent aqueous solution thereof has a viscosity at 20° C. of from about 40 to 70 centipoises, about 55 to 65 centipoises being more preferred. In general, the polyvinyl alcohol used should be substantially fully hydrolyzed by which reference is had to the fact that a given polyvinyl alcohol used contains not more than about 5 weight percent of residual ester groups (based on total polymer dry weight), and preferably not more than about 2 weight percent.

General, a polyvinyl polymer (as described above) containing adhesive systems can contain in addition to the polyvinyl polymer supplemental binder materials, fillers, and adjuvants. In general, polyvinyl alcohol adhesive systems as above characterized can have the following composition:

| Ingredient | Dry Basis Weight Percent |
| --- | --- |
| Polyvinyl Polymer | 2.5–35 |
| Supplemental binder | 0–25 |
| Fillers | 0–50 |
| Adjuvants | 0–10 |

Typical supplemental binders employed in the art include materials such as starch, dextrin, and synthetic polymeric materials, like phenol-aldehyde condensates, urea-formaldehyde condensates, polyvinyl acetate, polyacrylates, etc. Typical fillers employed in the art include materials such as clay, asbestos, mica, aluminum silicate pigments, wood floor, etc. Typical adjuvants employed in the art include:

A. fluidizing agents (such as urea, ammonium thiocyanate, etc.); and

B. complexing agents such as those which improve tack or improve water insolubility, such as boric acid and other boron compounds; or acidic metal salts having multivalent cations or the like.

Other adjuvants which can be employed, as those skilled in the art will appreciate, include viscosity control aids; dyes and pigments; plasticizers and humectants; stabilizers; and bactericides, germicides, fungicides, etc., and the like. Typical patents describing the preparation of polyvinyl alcohol adhesives include U.S. Pat. Nos. 3,320,200; 3,371,004; and 3,135,648, and the like.

It is preferred to employ polyvinyl alcohol adhesive systems which have quick tack characteristics. One quick tack measuring procedure is described in column 3, lines 33 through 64 of U.S. Pat. No. 3,371,004; by this procedure, it is preferred to employ adhesive systems having a quick tack strength of from about 2.7 to 10.1 grams per square centimeter. Quick tack is especially important in the single-facer operation corrugated board manufacture.

Commonly, an adhesive system at the time of use to make corrugated fiberboard of this invention is in the form of an aqueous dispersion or mixed aqueous dispersion, aqueous solution, and aqueous dispersion/solution mixture having a total solids content of from about 15 to 35 weight percent (based on total system weight). Typical viscosities range from about 200 to 8,000 centipoises.

DETAILED DESCRIPTION-MAKING CORRUGATED BOARD

If not stored interveningly, a treated medium and a liner member are combined together. Commercially, a conventional corrugating machine may be used for this operation.

Although an adhesive system as described above is generally discontinuously but automatically applied only to the flutes of a corrugated treated medium when using machinery to make corrugated fiberboard of this invention, typical machine adhesive application rates range from about 3 to 12 pounds adhesive solids per 1,000 sq. ft. of product corrugated fiberboard but more or less than this amount can be employed. Adhesive application rates are not critical and can be widely varied without departing from the spirit and scope of this invention.

After adhesive application, corrugated medium sheet member(s) and liner sheet member(s) are duly combined together, as in a so-called corrugating machine, into board, the resulting fiberboard construction is subjected to temperatures of from about 160° to 235° C. for times of from about 5 seconds to 5 minutes (200° to 225° C. for times of from about 5 to 30 seconds preferred) to substantially set the adhesive. Such a product is converted to one of this invention by heating such to usually somewhat higher temperatures and for times sufficient to substantially completely thermoset the aminoplast-containing phenol-aldehyde resin system in the treated paper of the board. Such setting of adhesive and thermosetting of treating resin can be accomplished in a single step, or in two steps, all as hereinafter further described and illustrated. Preferably, a corrugated fiberboard construction of this invention has two liner sheet members.

Usually, and conventionally, a corrugated fiberboard of this invention is promptly made into box blanks following manufacture, though it is possible and convenient to store the corrugated fiberboard before same is used to make box blanks. Box (or carton) blank manufacture is well known to those of ordinary skill in the art and does not form part of this invention. Conventional box blanks manufacture includes scoring, slotting, and slitting.

If the corrugated fiberboard used to make the blanks does not have its resin treated medium and (optionally) liner members thermoset, a final blank processing step is performed. Thus, in such event, usually before a blank is formed into a box, but after scoring, slotting, and related operations are completed, a resulting carton blank is heated to a temperature and for a time sufficient to substantially completely thermoset the phenol-aldehyde resin system impregnated into the medium and (optionally) liner members of the board. In general, suitable temperatures for this purpose range from about 160° to 235° C. applied for times ranging from about 2 to 10 minutes (with higher temperatures requiring shorter cure times). Such a thermosetting increases the water resistance properties (e.g., crush resistance, as indicated above) of the corrugated fiberboard and blanks made therewith.

DESCRIPTION OF DRAWINGS

The invention is better understood by reference to the attached drawings wherein.

Figure 1:
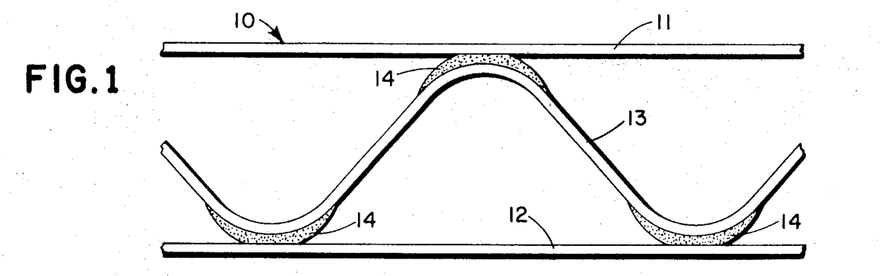
FIG. 1 is an enlarged, diagrammatic vertical cross-sectional view, some parts thereof broken away, of one embodiment of a corrugated fiberboard construction of this invention.

Turning to FIG. 1, there is seen a corrugated fiberboard construction of the present invention which is designated in its entirety by the numeral 10. Construction 10 is seen to incorporate a pair of facing liner sheet members 11 and 12. Interposed between liner sheet members 11 and 12 is a corrugated medium sheet member 13. The liner sheet members 11 and 12 are optionally treated with an aminoplast-modified phenolic resin as taught herein above, while the medium sheet member 13 is treated with an aminoplast-modified phenolic resin as taught herein above.

The tips of the flutes in the corrugated medium 13 are bonded to the adjacent faces of respective liner members 11 and 12 by means of a polyvinyl alcohol based adhesive system 14 as taught herein. Conventionally, the adhesive 14 is applied to the tips of the flutes during the combining operation of the medium 13 and the liners 11 and 12. After assembly, the construction 10 is heated as above described to set the adhesive 14 and produce the corrugated fiberboard 10.

Figure 2:
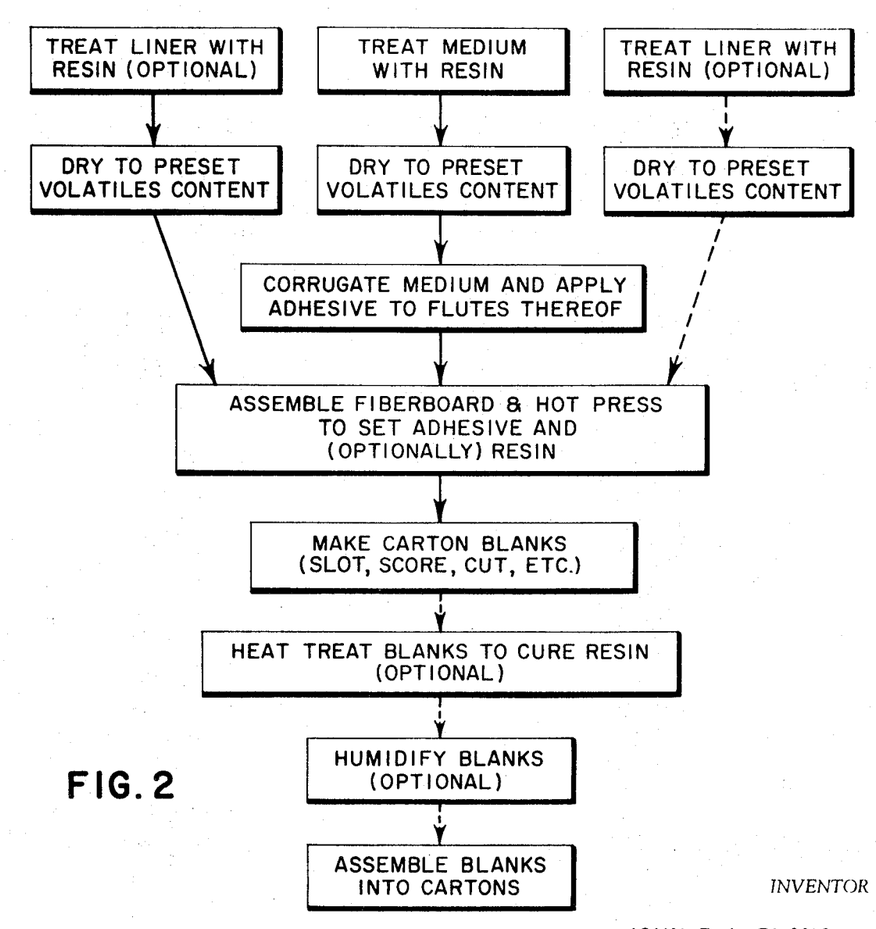
FIG. 2 is a simplified flow sheet illustrating the method of making corrugated fiberboard in accordance with the teachings of the present invention.

Steps in one embodiment of a process for making a fiberboard 10 are shown in FIG. 2. This block diagram is believed to be largely self-explanatory, particularly in view of the foregoing description, so no detailed explanation thereof is given herein. Observe that FIG. 2 merely illustrates one mode of practicing the present invention and that deviations and variations in accordance with the teachings of the present invention are possible without departing from the spirit and scope of this invention.

The machine used to make corrugated fiberboard usually combines into a single operation the steps of corrugating the medium, applying adhesives to the flutes thereof, and assembling the so-prepared medium with liner. Hot pressing of the so-assembled fiberboard is usually also accomplished in the same machine. Although the process embodiment of FIG. 2 discloses initially curing only the adhesive, it will be appreciated that it is convenient to practice the invention by curing both the adhesive and the resin for treatment of medium and liner members before exposing a product corrugated fiberboard to high-moisture conditions.

Those skilled in the art will appreciate that the type of corrugated fiberboard shown in FIGS. 1 and 2 is known to the trade as double-faced corrugated fiberboard since a medium sheet is combined with a so-called inner and so-called outer liner.

Single-faced corrugated fiberboard is made by using a single corrugated medium member and a single liner member; double-wall corrugated fiberboard comprises three liners with two corrugated medium members alternatively spaced between the liners; and triple-wall corrugated fiberboard comprises seven thicknesses and is made by bonding two single-faced boards into a double-faced board in which there are four liners and three corrugated medium members. All such corrugated fiberboard constructions are within the contemplation of the present invention.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate mixed resin systems and adhesive systems suitable for use in making products of this invention. Each such system has characteristics as above indicated as being useful in the manufacture of the products of this invention.

EXAMPLE A

An aqueous aminoplast containing phenol-aldehyde resin is made according to the teachings of example II of U.S. Pat. No. 3,004,941. The aminoplast is dicyandiamide. In the resin is dissolved 4 weight percent of ammonium chloride (based on total resin solids).

Fifty parts by weight of polyvinyl alcohol having a residual acetate content of less than 2 percent by weight and a 4-percent aqueous solution viscosity of 63 centipoises at 20° C. is dry blended with three parts of powdered glyoxal. The dry blend is dispersed in 950 parts of cold water and slurry is heated to 95° C. while maintaining agitation to dissolve components. The solution is then cooled to room temperature.

To 100 parts by weight of the aminoplast containing phenol-formaldehyde resin above prepared are added 200 parts by weight of the polyvinyl alcohol solution with agitation.

EXAMPLE B

An aqueous aminoplast containing phenol-aldehyde resin is made according to the teachings of example II, part B of U.S. Pat. No. 3,331,885. The aminoplast is melamine. In this resin is dissolved 3 weight percent of ammonium chloride (based on total resin solids).

To 100 parts by weight of the aminoplast containing phenol-formaldehyde resin above prepared are added 300 parts by weight of the polyvinyl alcohol solution as prepared in example A with agitation.

EXAMPLE C

An aqueous aminoplast containing phenol-aldehyde resin is made according to the teachings of example II, U.S. Pat. No. 3,444,119. The aminoplast is urea and dicyandiamide.

A 55 percent solids content polyvinyl acetate homopolymer emulsion produced by polymerizing vinyl acetate in water is prepared having a specific gravity at 20° C. of about 1.1; this material is available commercially under the trade designation Gelva Emulsion S-55 from Monsanto Company.

To 100 parts by weight of the aminoplast containing phenol-formaldehyde resin above prepared are added 35 parts by weight of the polyvinyl acetate emulsion with agitation.

EXAMPLE D

An aqueous aminoplast containing formaldehyde resin is made as follows:

In a reaction kettle is placed 200 parts by weight of 50 weight percent formalin. To the formalin is added 0.43 parts by weight glacial acetic acid solution. The resulting mixture is neutralized with 33 weight percent aqueous potassium hydroxide solution, and has a pH ranging from about 6.4 to 7.0. Next, to the mixture is added 100 parts by weight of crystalline urea and the mixture is heated to atmospheric reflux temperatures for about 2 hours. Thereafter, the mixture is cooled to 40° C. and neutralized with about a 33 weight percent potassium hydroxide solution to produce a product mixture having a pH of about 7.0 to 8.0. This product mixture is dehydrated under vacuum to the desired solids level (see below). The yield of urea-formaldehyde resinous product is about 225 weight percent (based on starting urea). This product urea-formaldehyde resin has the following characteristics:

| | |
|---|---|
| Total solids | 67–69% |
| Viscosity | 1,000–2,400 cps. |
| Free-formaldehyde (sodium sulfite method) | 3.0–6.0% |
| pH at 25° C. | 6.2–8.2 |
| Refractive index at 25° C. | 1.4900–1.4950 |
| Water dilutability | 7.5 to 1 |
| Total nitrogen content | 18–24% |

To prepare an aminoplast containing resin, 100 parts of the above resins are mixed with 100 parts of the phenol-formaldehyde resole resin prepared in example F (below).

To 100 parts by weight of the aminoplast containing phenol-formaldehyde resin above prepared are added 150 parts by weight of the polyvinyl alcohol solution as prepared in example A above with agitation.

EXAMPLE E

An aqueous aminoplast containing resin is made as follows:

To 100 parts of phenol in a reaction kettle are added first 180 parts of 50 percent formalin and then four parts of sodium hydroxide sufficient to bring the pH to about 8.6. The mixture is refluxed for about 4 hours at about 65° C., while maintaining a reaction pH of about 8.6. Thereafter, this mixture is cooled to about 40° C. This mixture is then neutralized to a pH of about 7.0 with aqueous diluted hydrochloric acid. The resulting mixture is dehydrated under vacuum to the desired solids level (see table A below). The product yield is about 270 weight percent based on starting phenol. The product has a water solubility such that a 55 weight percent aqueous solution of resole resin solids can be prepared. The resin characteristics are summarized in table A below.

Next, a solution comprising 30 parts by weight of urea, and 10 parts by weight of ammonium chloride both dissolved in 60 parts of water is prepared.

A resin system treating solution is made by diluting 50 parts of the resin with 25 parts of water and then adding thereto eight parts of the modifier solution. The product resin system comprises (on a 100 dry weight percent basis) about 84 weight percent phenol-formaldehyde resole resin; about 4 weight percent ammonium salt, and about 12 weight percent urea. The system has a pH of about 1.5 when in the form of an aqueous solution of about 35 weight percent total resin system solids. As thus made, however, this system contains about 30 weight percent total resin system solids with the balance up to 100 weight percent being water.

To 100 parts by weight of the aminoplast containing phenol-formaldehyde resin above prepared are added 300 parts by weight of the polyvinyl alcohol solution as prepared in example A with agitation.

EXAMPLE F

An aqueous aminoplast containing resin is made as follows:

To 100 parts of phenol in a reaction kettle are added first 170 parts of 50 percent formalin and the six parts of calcium hydroxide sufficient to bring the pH to about 8.6. The mixture is refluxed for about 4 hours at 62° C. Thereafter, the mixture is cooled to 40° C. The mixture is then neutralized to a pH of 7.2 with carbon dioxide. The resin is filtered to remove the calcium carbonate. The product has a water solubility such that a 55 weight percent aqueous solution of resole resin solids can be prepared. The resin characteristics are summarized in table A below.

Next, there is prepared a solution comprising 400 parts by weight of urea, and 150 parts by weight of ammonium chloride in 600 parts by weight of water.

A resin system treating solution is made by diluting 100 parts of the resin with 100 parts of water and adding thereto 12 parts of the modifier solution. The product resin system comprises (on a 100 dry weight percent basis) about 20 weight percent phenol-formaldehyde resole resin; about 1.5 weight percent ammonium salt, and about 3.5 weight percent urea. The system has a pH of about 2.0 when in the form of an aqueous solution of about 35 weight percent total resin system solids. As thus made, however, this system contains about 25 weight percent total resin system solids, with the balance up to 100 weight percent being water.

To the resulting solution are added 100 parts by weight of a polyvinyl alcohol solution prepared as in example A above but without glyoxal, and 50 parts by weight of the polyvinyl acetate homopolymer emulsion described in example C above with agitation.

EXAMPLE G

An aqueous aminoplast containing resin is made as follows:

To 100 parts phenol in a reaction kettle are added 150 parts of 50 percent formalin and four parts triethylamine amine as a catalyst. The mixture is refluxed at about 70° C. for about 4 hours until a free formaldehyde end point of 8.6 percent is reached. The resin product is then cooled to 30° C. It has a solids content of about 48.0 weight percent. The product has a water solubility such that a 55 weight percent aqueous solution of resole resin solids can be prepared. The resin characteristics are summarized in table A below.

A resin system treating solution is made by diluting 100 parts of the resin with 100 parts of water and adding thereto 20 parts of the modifier solution. The product resin system comprises (on a 100 dry weight percent basis) about 20 weight percent phenol-formaldehyde resole resin, and about 4.0 weight percent urea. As thus made, however, this system contains about 25 weight percent total resin system solids with the balance up to 100 weight percent being water.

Independently, a polyvinyl acetate homopolymer emulsion as described in example C above is partially hydrolyzed using sulfuric acid as catalyst and heat until about 7 weight percent of the acetate groups are hydrolyzed to polyvinyl alcohols thereby providing potential cross-linking sites on polyvinyl acetate molecules.

To 100 parts by weight of the aminoplast containing phenol-formaldehyde resin above prepared are added 100 parts by weight of the above-prepared partially hydrolyzed polyvinyl acetate emulsion with agitation.

TABLE A

|  | Example E | Example F | Example G |
| --- | --- | --- | --- |
| Total resin solids in aqueous solution | 55 | 50 | 48 |
| Free formaldehyde[1] | 9 | 6 | 8.5 |
| pH[2] | 7 | 7.2 | 8.0 |
| Combined average moles formaldehyde[3] | 2.25 | 2.25 | 2.15 |
| Ash content[4] | 2.3 | 0.3 | 0 |

[1] Free formaldehyde content determined by the so-called hydroxylamine hydrochloride method.

[2] pH measured at 25° C. using an aqueous solution of about 35 weight percent total resin solids.

[3] Measured by methylol content and methylene bridges per aromatic ring using nuclear magnetic resonance on a sample of product.

[4] Ash content determined using a 35 weight percent aqueous solution of total resins at 150°C. at 2 hours and thereafter pyrolyzed for 24 hours at 540° C.

EXAMPLE H

A polyvinyl alcohol adhesive as described in example 1 of U.S. Pat. No. 3,324,065 is prepared.

EXAMPLE I

A polyvinyl alcohol adhesive as described in example 1 of U.S. Pat. No. 3,320,200 is prepared.

EXAMPLE J

A polyvinyl alcohol adhesive as described in example 2 of U.S. Pat. No. 3,135,648 is prepared.

EXAMPLE K

A polyvinyl alcohol adhesive as described in example E (col 4, lines 40-64) of U.S. Pat. No. 3,371,004 is prepared.

EXAMPLE L

A resorcinol-starch-formaldehyde adhesive system for use in this invention is prepared as follows:

To 125 gallons of water is added 142 pounds of a commercially available resorcinol-starch-mixture (from Penick and Ford under the trade designation Douglas Waterproof Corrugating Adhesive 07) and 150 pounds of cornstarch.

The resulting mixture is heated to from about 140° to 145° F. for 10 minutes at which time there is added thereto additionally 10 gallons of water and 20 pounds of caustic (sodium hydroxide). This last mixture is agitated for an additional 10 minutes thereafter at an elevated temperature of about 140° F. Finally, to the resulting mixture is added an additional 80 gallons of water. The product constitutes what can be termed the primary mixture, or carrier portion, of the adhesive system.

Next, is prepared the secondary mixture or raw starch portion, as follows:

To 250 gallons water is added 1,000 pounds of cornstarch and 68 pounds of 37 percent aqueous formaldehyde. The composition is mixed at room temperature.

Finally, the primary mixture and the secondary mixture are admixed together and stirred for about 1 hour. The product is an adhesive system ready for use. This adhesive system has a total resorcinol to total starch weight ratio (based on total adhesive system solids) of from about 1 to 7, and it contains about 1.0 weight percent (based on total adhesive system solids) of combined formaldehyde, as well as about 70 weight percent (based on total adhesive system solids) of starch. It has a total adhesive solids content of about 25 weight percent, a viscosity of about 1,000 centipoises and a gel point of about 150° F. determined by heating the adhesive in a water bath heated gradually to the gel temperature.

EXAMPLE M

A phenol-formaldehyde-starch adhesive system for use in this invention is prepared as follows:

To 16 weight parts of water is added five parts of the phenol-formaldehyde resin prepared as described in example E above, 2.1 parts of a 23 percent caustic (sodium hydroxide) solution, and 4.4 parts of cornstarch.

The resulting mixture is heated to 155°-165° F. with continuous mixing and mixed an additional 10-20 minutes at 155°-165° F. Finally, 13 parts of cooling water is added to the mixture. This product constitutes what can be termed the primary mixture, or carrier portion, of the adhesive system.

Next is prepared the secondary mixture or raw starch portion as follows:

To 41 parts water is added 18 parts cornstarch. The composition is mixed at room temperature.

Finally, the primary mixture and the secondary mixture are admixed together and stirred for about 1 hour. The product is an adhesive system ready for use. The adhesive system has a total phenolic resin to total starch weight ratio (based on total adhesive system solids) of from about 1 to 8.6. It has a total adhesive solids content of about 25 percent, a viscosity of about 800 cps., and a gel point of about 148° F., as determined by heating the adhesive in a water bath heated gradually to the gel temperature.

EXAMPLE N

A urea-starch-formaldehyde adhesive system for use in this invention is prepared as follows:

Two hundred thirty-four pounds of carrier starch are heated at 180° F. in 84 gallons of water, cooled to 140° F. and 126 gallons of water added. Four-hundred sixty-eight pounds of raw cornstarch are then added and mixed to form a uniform dispersion. The pH is adjusted to 7-8 with sodium carbonate. When the temperature drops to about 90° F., 160 pounds of the water-soluble urea-formaldehyde resin of example D are added and mixed. Immediately prior to use the pH is adjusted to about 5.5 with an acid salt, ammonium chloride.

The product adhesive has a total solids content of about 32 weight percent (starch plus urea-formaldehyde resin) and it contains about 15 percent urea-formaldehyde resin solids based on total solids.

EXAMPLE O

An aminoplast modified phenol-formaldehyde-starch adhesive system for use in this invention is prepared using the procedure of example F (above) but substituting for the resole resin then used the aminoplast modified resin of example A (above).

The following examples illustrate the manufacture of corrugated fiberboard of the present invention using the above-described resole resins and adhesive systems.

EXAMPLE 1

Each side of a 26 pound basis weight medium paper sheet about 0.009 inch thick are roller coated with aminoplast containing phenol-aldehyde resin system of example A to a total resins content of about 8 weight percent based on the dry weight of the sheet plus resin. One side of a 42-pound basis weight Kraft liner paper sheet about 0.012 inch thick is roller coated with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet as so prepared is corrugated into type B flutes of about 50 per foot, and the polyvinyl alcohol adhesive of example H is applied to the tips of the flutes of the medium corrugations at the rate of about 8 pounds adhesive solids per 1,000 sq. ft. of product fiberboard. This medium is then combined with two pieces of such liner sheet as prepared above one on each side of the adhesive treated medium sheet so as to form a corrugated fiberboard. This board is now exposed to a temperature of about 160° C. for about 10 seconds to dry and thermoset the adhesive. This product can be considered to be an intermediate corrugated fiberboard product which may be converted as herein below described into a corrugated fiberboard product of this invention.

One portion of this intermediate product board is exposed to about 180° C. for about 4 minutes to thermoset the treating resin, and thereby produce product corrugated fiberboard of this invention. This fiberboard is then converted into a first set of box blanks by cutting, slotting, and scoring.

A second portion of this intermediate product board is converted into a similar but second set of box blanks by cutting, slotting, and scoring. These blanks are then exposed to about 180° C. for about 4 minutes to thermoset the treating resin and thereby produce product corrugated fiberboard of this invention.

The first and the second box blanks are then formed into containers, and each such respective container is compression tested for dry and wet strength (top to bottom) using ASTM Test Procedure No. D-642-47. A container of similar dimensions is made from a blank composed of conventional untreated medium and liner members and the adhesive of example H. The compression tests are conducted on containers which are exposed before testing to 50 percent relative humidity for 24 hours at about 22° C. and also to a water immersion for 24 hours at about 22° C. The results show that the treated containers retain 30 to 40 percent of their original compression strength after water immersion whereas the untreated containers retain substantially no compression strength after water immersion.

Samples of corrugated board from the first box blanks, and samples of corrugated board from the second box blanks are tested, along with samples of corrugated board from the untreated box blanks, for flat crush resistance before and after water immersion using ASTM Test Procedure D-1225-54. The results show that the treated board retains substantial strength after water immersion whereas the untreated board retains substantially no strength after water immersion.

EXAMPLE 2

Using the procedure employed in example 1 to make the second blanks of that example, but instead employing as the medium one having type C flutes and using a 33-pound basis weight paper 0.011 inch thick having a 10 weight percent treating resin content and a 7 percent volatiles content, and further employing as the liner a 69-pound basis weight paper 0.018 inch thick having a 5 weight percent treating resin content and an 8 percent volatiles content, blanks and then containers are made and similarly compression tested (top to bottom). The containers display excellent compression strength after water immersion. Samples of the corrugated board used in such blanks are similarly (example 1) evaluated for flat crush resistance and are found to have excellent flat crush resistance after water immersion.

EXAMPLE 3

Using the procedure employed in example 1 to make the second blanks of that example, but instead employing as the medium one having type C flutes and using a 33-pound basis weight paper 0.009 inch thick impregnated with 10 weight percent of the resin treating solution of example B and dried to a 5 percent volatiles content, and instead employing an untreated liner paper having a 12-pound basis weight and a thickness of 0.012 inch. The product board is heated to 200° C. for 3 seconds, and then is cut, scored, and slotted to form a box blank. The product blank is heated in a forced draft oven for 2 minutes at 200° C. to complete resin curing. The product blanks are formed into containers and evaluated for compression strength as in example 1, and board used in the blanks is evaluated for flat crush resistance as in example 1. The results show the product board and blank to have excellent flat crush resistance and excellent compression strength, respectively, after water immersion.

EXAMPLES 4–12

Using the procedure employed in example 1 to make the first board and blanks there described, a series of corrugated box blanks are made, and evaluated as in example 1. In each case, the medium, the liner, the treating resin and the adhesive are as described in table 4 below. The corrugated board and blanks made therefrom display excellent crush resistance after water immersion when evaluated by the procedures described in example 1 above.

TABLE 4

| Ex. No. | Medium[1] | | Liner | | Treating resin system | | | | | Amount adhesive applied[2] |
|---|---|---|---|---|---|---|---|---|---|---|
| | | | | | Ex. No. | Amount in medium | | Amount in liner | | |
| | Thickness (in inches) | Basis, weight | Thickness (in inches) | Basis, weight | | Percent resin | Percent vol. | Percent resin | Percent vol. | Ex. No. |
| 4 | .009 | 26 | .020 | 69 | C | 12 | 8 | 3 | 5 | H | 6 |
| 5 | .011 | 33 | .020 | 69 | D | 10 | 6 | 7 | 8 | I | 6 |
| 6 | .011 | 33 | .020 | 69 | E | 12 | 7 | | | J | 6 |
| 7 | .009 | 26 | .020 | 69 | F | 12 | 8 | 3 | 5 | H | 6 |
| 8 | .009 | 26 | .020 | 69 | G | 11 | 5 | 5 | 5 | K | 6 |
| 9 | .009 | 26 | .020 | 69 | A | 12 | 8 | 3 | 5 | L | 5 |
| 10 | .011 | 33 | .020 | 69 | D | 10 | 6 | 7 | 8 | M | 7 |
| 11 | .011 | 33 | .020 | 69 | E | 12 | 7 | | | N | 7 |
| 12 | .009 | 26 | .020 | 69 | G | 12 | 8 | 3 | 5 | O | 6 |

[1] Flutes in corrugated medium are Type B (about 50 per foot).
[2] Lbs. adhesive solids/1,000 ft.² of product board.

What is claimed is:

1. A corrugated fiberboard construction adapted to be rigid when wet comprising:
   A. as a medium, a corrugated cellulosic sheet member having a thickness of from about 7 to 15 thousandths of an inch and a basis weight of from about 25 to 36 pounds per 1,000 sq.ft., said sheet member containing from about 5 to 15 weight percent (dry weight basis) of a mixed resin system and said sheet member having a total volatiles content of from about 3 to 10 weight percent.
   B. said mixed resin system comprising (on a 100 parts by weight dry basis):
      1. from about 25 to 95 weight percent of at least one aminoplast containing phenol-aldehyde resin system selected from the group consisting of:
         a. condensation reaction products of phenol, formaldehyde, and at least one aminoplast selected from the group consisting of urea, melamine, and dicyandiamide, and
         b. compositions comprising a phenol-formaldehyde resole resin and at least one such aminoplast, and each such aminoplast containing resin being further characterized by having:
         c. a mol ratio of combined formaldehyde to phenol ranging from about 1.0 to 3.0,
         d. a total nitrogen content ranging from about 3 to 20 weight percent (based on total dry resin weight), and
         e. a water solubility such that at least about a 30 weight percent aqueous solution of resin solids can be prepared, and
      2. from about 5 to 75 weight percent of at least one polyvinyl polymer selected from the group consisting of: polyvinyl acetate, partially hydrolyzed derivatives of polyvinyl acetate, and substantially fully hydrolyzed polyvinyl alcohol, and each such polyvinyl polymer being further characterized by having a molecular weight such that an aqueous solution or colloidal dispersion (including latices, emulsions, etc.) thereof can be prepared initially which, at a polymer concentration of about 4 weight percent, has a viscosity of from about 5 to 125 centipoises,
   C. as a liner, a cellulosic sheet member having a thickness of from about 5 to 20 thousandths of an inch and having a basis weight of from about 33 to 120 pounds per 1,000 sq. ft.,
   D. as a bonding composition, a water-resistant adhesive system employing at least one polymer selected from the group consisting of said aminoplast containing phenol-aldehyde resin systems, said polyvinyl polymers, urea-formaldehyde resins and phenol-formaldehyde resins,
   E. said corrugated medium sheet member being positioned adjacent said liner sheet member and being bonded thereto at positions of mutual contact therebetween by said bonding composition, and
   F. such resulting construction having been subjected to a temperature of from about 160° to 235° C. for times of from about 0.5 seconds to 5 minutes.

2. A construction of claim 1 in which said mixed resin system further contains from about 0.2 to 5 weight percent of an ammonium salt of a mineral acid.

3. A construction of claim 1 which has been subjected to temperatures and times sufficient to substantially completely thermoset said aminoplast containing phenol-aldehyde resin system.

4. A box blank prepared from a corrugated fiberboard construction of claim 1.

5. A box blank prepared from a corrugated fiberboard construction of claim 3.

6. The box blank of claim 4 wherein said blank has been subjected to temperatures and times sufficient to substantially completely thermoset said aminoplast containing phenol-aldehyde resin system.

7. A construction of claim 1 wherein said liner member is treated with from about 2 to 10 weight percent (dry weight basis) with a said aminoplast containing phenol-aldehyde resin and has a total volatiles content of from about 3 to 10 weight percent.

8. A construction of claim 7 which has been subjected to a combination of temperatures and times sufficient to substantially completely thermoset said aminoplast containing phenol-aldehyde resin system.

9. A construction of claim 1 wherein said bonding composition contains starch.

10. A construction of claim 1 wherein said bonding composition comprises a resorcinol-formaldehyde-starch adhesive system.

* * * * *